(12) United States Patent
Ouellette et al.

(10) Patent No.: US 12,444,198 B2
(45) Date of Patent: Oct. 14, 2025

(54) INCIDENT SURVEILLANCE USING UNMANNED MOBILE MACHINES

(71) Applicant: Tyco Fire & Security GmbH, Neuhausen am Rheinfall (CH)

(72) Inventors: Jason M. Ouellette, Leominster, MA (US); Gopal Paripally, North Andover, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 32 days.

(21) Appl. No.: 18/182,090

(22) Filed: Mar. 10, 2023

(65) Prior Publication Data

US 2024/0303991 A1    Sep. 12, 2024

(51) Int. Cl.
  *G06V 20/52* (2022.01)
  *B64C 39/02* (2023.01)
  *G05D 1/00* (2024.01)
  *B64U 101/31* (2023.01)

(52) U.S. Cl.
  CPC ............ *G06V 20/52* (2022.01); *B64C 39/024* (2013.01); *G05D 1/104* (2013.01); *G05D 1/12* (2013.01); *B64U 2101/31* (2023.01); *B64U 2201/10* (2023.01)

(58) Field of Classification Search
  None
  See application file for complete search history.

(56) References Cited

U.S. PATENT DOCUMENTS

| | | | |
|---|---|---|---|
| 10,558,226 B1 | 2/2020 | Bigdeli | |
| 10,777,051 B1 | 9/2020 | Kumar et al. | |
| 10,796,562 B1 | 10/2020 | Wild | |
| 11,340,079 B1* | 5/2022 | Ebrahimi Afrouzi | G01C 21/188 |
| 11,415,486 B2 | 8/2022 | Roberts et al. | |
| 11,534,919 B2 | 12/2022 | Heintzelman et al. | |
| 2006/0290779 A1* | 12/2006 | Reverte | E03F 7/10 348/84 |
| 2018/0279847 A1* | 10/2018 | Park | A47L 9/2857 |
| 2018/0312255 A1 | 11/2018 | Illuminati et al. | |
| 2018/0335778 A1* | 11/2018 | Trivelpiece | G08B 25/10 |
| 2021/0076008 A1 | 3/2021 | Seyfi et al. | |
| 2021/0174370 A1* | 6/2021 | Yim | G06Q 10/06316 |
| 2023/0011503 A1* | 1/2023 | Duke | G06F 16/55 |
| 2023/0021649 A1* | 1/2023 | Ono | E02F 9/20 |
| 2023/0297931 A1* | 9/2023 | Otsuki | G06Q 10/0635 705/348 |
| 2024/0078861 A1* | 3/2024 | Lert | G07F 9/009 |
| 2024/0134378 A1* | 4/2024 | Wise | B60L 53/68 |

FOREIGN PATENT DOCUMENTS

| | | | |
|---|---|---|---|
| CN | 115106999 A | * | 9/2022 |
| EP | 3996058 A1 | | 5/2022 |
| KR | 102012770 B1 | | 8/2019 |

* cited by examiner

*Primary Examiner* — Hung Q Dang

(74) *Attorney, Agent, or Firm* — ArentFox Schiff LLP

(57) ABSTRACT

Disclosed herein are apparatuses and methods for operating an unmanned mobile machine (UMM) to surveil potential incidents, including receiving an indication of a potential incident within an area associated with a building, transmitting a command to the UMM to travel to a location associated with the potential incident, and receiving, from the UMM located at the location, information regarding the potential incident including an interaction of the UMM at the location. Other aspects relate to functions of the UMM.

19 Claims, 4 Drawing Sheets

INCIDENT SURVEILLANCE USING UNMANNED MOBILE MACHINES

TECHNICAL FIELD

The present disclosure relates generally to systems and methods for performing incident surveillance. More particularly, the present disclosure relates to implementing systems and methods for incident surveillance using unmanned mobile machines (e.g., drones).

BACKGROUND

Building management systems are provided to automate management of certain building activities, such as building security and surveillance, building access, emergency services notifications, and/or the like. As such, a building management system is coupled with various devices situated within, outside, or otherwise related to a given building, and the devices can report information to a building management system. In some deployments, the building management system can be coupled with one or more sensors that provide information of potential incidents within or outside of the building. The sensors can include one or more cameras that provide surveillance video of areas within or outside of the building, smoke or carbon monoxide detectors or other air quality sensors, audible sensors, such as microphones, that can identify certain sounds, safety stations that allow for manual notification of a potential issue, etc. The building management system can identify potential incidents within the building based on input from the sensors. In one example, based on video from the one or more cameras, the building management system can facilitate identification of a potential incident, whether by a manual process of security personnel identifying the potential incident based on the video or from an automated process of image processing/recognition to identify the potential incident. The building management system can alert personnel of the potential incident to allow the personnel to take actions to rectify the potential incident.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes an apparatus for operating an Unmanned Mobile Machine ("UMM") to perform incident surveillance including a memory, and a processor communicatively coupled with the memory. The processor is configured to receive an indication of a potential incident within an area associated with a building, transmit a command to the UMM to travel to a location associated with the potential incident, and receive, from the UMM located at the location, information regarding the potential incident including an interaction of the UMM at the location.

Another example implementation includes an apparatus for surveilling a potential incident including a memory, a processor communicatively coupled with the memory, a camera, and a navigation, drive, and flight (NDF) system configured to travel to locations associated with a building. The processor is configured to receive, from a building management system, a command to travel to a location associated with a potential incident, travel, via the NDF system, to the location associated with the potential incident, perform, via the camera, an interaction related to the potential incident to acquire information regarding the potential incident, and transmit, to the building management system, the information regarding the potential incident.

Another example implementation includes a computer-implemented method for operating a UMM to perform incident surveillance, including receiving, by a building management system, an indication of a potential incident within an area associated with a building, transmitting, by the building management system, a command to the UMM to travel to a location associated with the potential incident, and receiving, from the UMM located at the location, information regarding the potential incident including an interaction of the UMM at the location.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
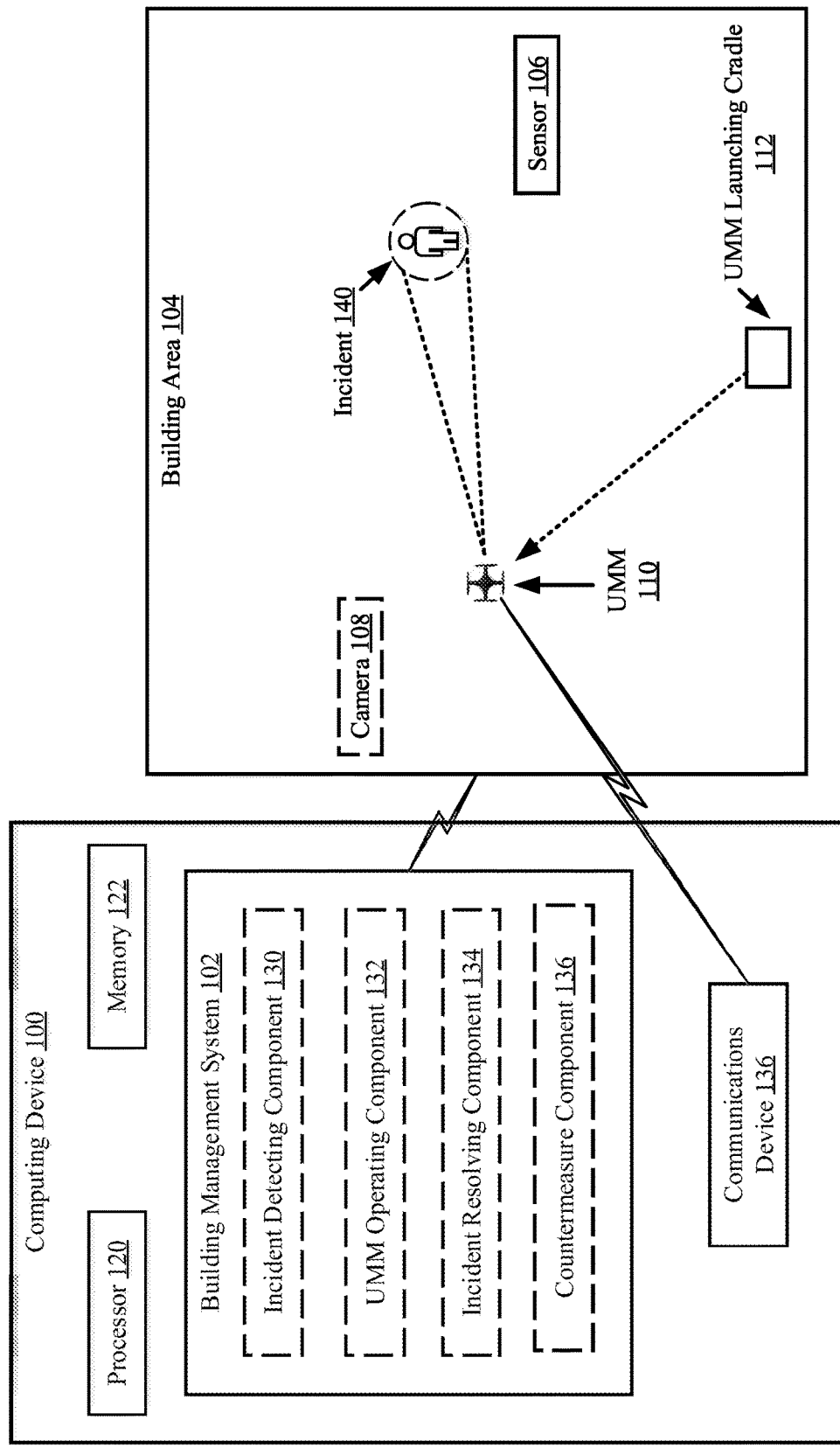
FIG. 1 is a diagram of an example of a computing device that provides a building management system for monitoring activities or potential issues for an area associated with a building, in accordance with some aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects described herein relate to employing one or more unmanned mobile machines (UMMs) to provide video surveillance for potential incidents identified in a building management system. The UMMs may include unmanned aerial vehicles, such as drones, or other vehicles that can be remotely operated to move throughout an area. A building management system can include substantially any system that can communicate with one or more sensors to detect potential incidents in an area associated with a building (e.g., an area within or outside of the building). Such systems can include or employ video surveillance systems, alarm systems (e.g., such as fire alarm systems, loss prevention systems, electronic article surveillance systems), radio frequency identification (RFID) systems, power management or heating, ventilation, and air conditioning (HVAC) systems, etc. The building management system can communicate with such systems to receive indications of potential incidents, such as in the form of alarm triggers, which may also include location information for the incident and/or of the associated sensor. In another example, the building management system can identify potential incidents based on other data received from such systems or associated sensors, such as by monitoring a video feed for potential incidents, analyzing an audio feed for certain sounds, speech, etc., monitoring air quality levels, power outage information, and/or the like.

In accordance with aspects described herein, when the building management system receives or otherwise generates an identification of a potential incident within or outside of the building, the building management system can autonomously operate one or more UMMs to travel to an area or location related to the incident to gather additional information, attempt to rectify the potential incident, and/or the like. For example, the building management system can transmit, to the UMM, a command to travel to a particular location and to operate one or more input devices to provide the additional information back to the building management system, which may include a recorded video or a real-time/live video stream, recorded audio or real-time/live audio stream, temperature, air quality, an indication of identified objects, persons, animals, or vehicles (or an estimated number of objects, persons, animals, or vehicles), etc. In some examples, the building management system can generate at least some of the additional information based on a received video or audio (e.g., using artificial intelligence to identify objects, sounds, etc.). In some examples, tracking technologies, such as a radar, or frequency, may be provided for ground and/or air tracking of the security UMMs as a counter measure for the autonomous operations of the UMMs by the building management system.

In this regard, the UMM can, in some examples, provide a mobile security or surveillance camera that is automatically launched to surveil a potential incident, track a subject identified for the potential incident, etc., without requiring security personnel to launch or operate the UMM. This can reduce delay in responding to or investigating potential incidents, speed up effective response to the potential incident, provide more immediate situational awareness, and/or the like.

FIG. 1 is a diagram of an example of a computing device 100 that provides a building management system 102 for monitoring activities or potential issues for a building area 104. For example, building management system 102 can monitor the activities or potential issues within or outside of the building, in an area associated with the building, etc. Building management system 102 can communicate with one or more sensors 106, which may optionally include one or more cameras 108 or other sensors, such as smoke or carbon monoxide detectors or other air quality sensors, audible sensors, such as microphones, that can identify certain sounds, safety stations, light sensors (e.g., for monitoring for power outage), HVAC operational sensors, or substantially any sensor that can monitor a condition within a building area 104, which can include an interior of a building, an exterior of a building (e.g., within a defined perimeter of the building), etc. for detecting potential incidents. One or more UMMs 110 can also be deployed within the building area 104, which can have an associated launching cradle 112 where the UMM 110 can be located when not in flight. In an example, the UMM 110 can be configured to fly within and out of a building in the building area 104 or there may be different UMMs 110 for surveillance inside the building and outside of the building, etc. In an example, the UMM 110 can receive electronic charging for a battery of the UMM 110 when situated at the UMM launching cradle 112.

Computing device 100 can include a processor 120 (and/or multiple processors) and/or a memory 122 configured to execute or store instructions or other parameters related to performing one or more processes, executing the building management system 102, etc. For example, processor 120 and memory 122 may be separate components communicatively coupled by a bus (e.g., on a motherboard or other portion of a computing device, on an integrated circuit, such as a system on a chip (SoC), etc.), components integrated within one another (e.g., processor 120 can include the memory 122 as an on-board component), and/or the like. Memory 122 may store instructions, parameters, data structures, etc. for use/execution by processor 120 to perform functions described herein. In addition, for example, computing device 100 can include multiple computing devices distributed across a network (e.g., in a network or cloud-based deployment), where each of the computing devices can include one or more functions described herein.

In an example, the building management system 102 can optionally include an incident detecting component 130 for receiving or generating indications or triggers of possible incidents, a UMM operating component 132 for transmitting commands to operate, and/or receiving information from, one or more UMMs, and/or an incident resolving component 134 for performing one or more actions for resolving a potential incident, receiving notification that the incident is resolved, etc. In some examples, the building management system 102 may also include a countermeasure component 136 for providing tracking technologies, such as a radar, or frequency, for the UMMs 110 for ground and/or air tracking of the UMMs 110 as a counter measure for the autonomous operations of the UMMs 110 by other components of the building management system.

In one example, computing device 100 can communicate with one or more other devices or systems via a network (not shown), such as with the one or more sensors 106 or cameras 108. Computing device 100 can also communicate with the one or more UMMs 110 via the network. Computing device 100 can employ a communications device 136 to communicate with the one or more sensors 106, cameras 108, and/or UMMs 110. For example, the communications device 136 can include substantially any device that can connect to a wired or wireless network for communicating with other devices, such as a network interface card for a wireless local area network (WLAN), Bluetooth, RFID, or other connection, a user equipment (UE) to communicate over a cellular network, and/or the like. In any case, for example, building management system 102 can be coupled to and/or can communicate with the various sensors 106 or camera 108 installed throughout the building area 104, as described, to monitor certain areas of the building, receive alerts of potential incidents or issues, and/or the like.

For example, incident detecting component 130 can receive an alert from one or more sensors 106 or cameras 108, where the alert identifies or otherwise relates to a potential incident 140 occurring in the building area 104. For example, incident detecting component 130 can receive an alert from a fire alarm sensor, temperature sensor, smoke or carbon monoxide detector, etc., of a potential incident 140. In this example, incident detecting component 130 may determine a location associated with the potential incident based on a location of the sensor 106 reporting the alert. In another example, incident detecting component 130 may receive an alert from an occupancy sensor or access control system of activity or attempted access in an area that is closed (e.g., to everyone or restricted only to authorized personnel), and incident detecting component 130 can determine the location associated with the occupancy sensor.

In yet another example, incident detecting component 130 can receive video from one or more cameras 108, which may be sent or activated in conjunction with the sensor(s) 106 identifying the potential incident 140, and/or may be used to identify or clarify or assign a severity to the potential incident 140. In one example, camera 108 can send video to the building management system 102 (e.g., constantly or based on an alert from a nearby sensor), and incident detecting component 130 can monitor the video to detect possible incidents. For example, incident detecting component 130 can process images from the video using artificial intelligence (AI) to detect certain objects, activities, persons not authorized to be in the area, etc. to detect the potential incident 140. In addition, for example, the one or more cameras 108 can indicate location information of the potential incident 140, which may be of a certain granularity or accuracy depending on the source of the location information. For example, the location information may be based on a known installation location of the camera 108, direction or orientation of the camera 108 lens, a zoom level, known artifacts within view of the camera 108, global positioning system (GPS) coordinates of the camera 108, triangulated position of the camera 108 based on surrounding wireless signals, etc.

In yet another example, incident detecting component 130 can receive audio from one or more sensors 106, which may be sent or activated in conjunction with the sensor(s) 106 identifying the potential incident 140, and/or may be used to identify or clarify or assign a severity to the potential incident 140. In one example, sensor 106 can include a microphone that can record and send audio (e.g., in conjunction with video where the sensor 106 is or also includes a camera 108) to the building management system 102 (e.g., constantly or based on an alert from a nearby sensor), and incident detecting component 130 can monitor the audio to detect possible incidents. For example, incident detecting component 130 can process the audio to identify certain sounds that may indicate a potential incident, such as gunfire. In another example, the sensor 106 may detect a directionality of the audio to provide more accurate location information to the building management system 102.

In the above and various other examples, incident detecting component 130 can detect a potential incident 140 in the building area 104 as well as some location information associated with the potential incident 140. The building management system 102 can operate a UMM 110 using UMM operating component 132 to transmit commands to the UMM 110 to cause the UMM 110 to travel within the building area 104 (e.g., inside or outside of the building) to provide more information regarding the potential incident 140. For example, based on incident detecting component 130 detecting the potential incident 140, UMM operating component 132 can transmit a command to the UMM 110 to travel to a location related to the potential incident 140, such as by providing GPS coordinates of the location or other flight path information to fly to the location. In an example, incident detecting component 130 can specify, to the UMM operating component 132, the location based on location information indicated for the potential incident 140, as detected or otherwise received by the incident detecting component 130. Based on the command, for example, UMM 110 can travel to the indicated location (e.g., starting from its UMM launching cradle 112 or another location).

In an example, UMM operating component 132 can also command the UMM 110 to provide information regarding the potential incident using one or more input devices of the UMM 110, such as a camera situated on the UMM 110, and the UMM 110 can provide the information, such as a video stream from the camera. As described, for example, the building management system 102 and UMM 110 can communicate over one or more networks using one or more communication interfaces, and UMM operating component 132 can receive the information from the UMM 110 in this regard. In an example, incident detecting component 130 can use the information to deduce additional information regarding the potential incident 140 or for providing to security or other personnel for evaluation or analysis of the additional information. For example, incident detecting component 130 can process the additional information, such as a video stream from the UMM 110, to more clearly identify the potential incident 140, objects or actors involved in the incident, etc. In an example, the UMM 110 may provide other information, such as sensor information from sensors on the UMM 110, such as a temperature or air quality sensor, to the UMM operating component 132 for providing to the incident detecting component 130 to detect additional information regarding the potential incident 140.

In other examples, UMM operating component 132 can command the UMM 110 to perform other functions based on the incident identified by incident detecting component 130. For example, where the potential incident is a power outage (e.g., as alerted by a power management system in the building, a light sensor, etc.), UMM operating component 132 can instruct the UMM 110 to turn on a flashlight equipped on the UMM 110. In another example, UMM operating component 132 can command the UMM 110 to obtain a device from one location and drop it at the location of the potential incident 140, such as a pharmaceutical injection device, a defibrillator or related components, safety devices, etc.

In another example, UMM operating component 132 can command the UMM 110 to track one or more objects or persons based on the potential incident 140, or the additional information obtained for the potential incident 140. For example, UMM 110 can travel to the location and provide the additional information to the UMM operating component 132, which can provide the additional information to incident detecting component 130. For example, as described, the additional information may include a video, and incident detecting component 130 can identify, based on the video (e.g., using AI to process images from the video) or based on another identification mechanism, a person involved in the potential incident 140 as a possible perpetrator. Incident detecting component 130, via UMM operating component 132, can accordingly transmit a command to the UMM 110 to track or follow the possible perpetrator, provide additional video, obtained during tracking, back to the building management system 102 (or other information, such as tracked location), etc.

In an example, UMM operating component 132 can transmit commands to multiple UMMs 110 to operate the multiple UMMs to travel to locations related to the potential incident 140, to report additional information regarding the potential incident 140, to perform one or more operations for the potential incident 140 and/or base don the additional information, and/or the like, as described. In one example, UMM operating component 132 can select the UMM 110, from multiple UMMs, to operate to travel to the location associated with the potential incident 140. For example, UMM operating component 132 can select the UMM 110 based on a proximity of the UMM 110 to the location associated with the potential incident 140. In another example, UMM operating component 132 can select the UMM 110 based on a battery life or power capacity, or based on available functions of, the UMM 110 as compared to the other multiple UMMs.

In yet another example, UMM operating component 132 can detect a condition on the UMM 110, and may determine to switch the UMM 110 with another UMM based on the condition. For example, the condition may relate to a battery life or other health consideration of the UMM 110. In an example, UMM operating component 132 can transmit a command to the UMM 110 to return to the UMM launching cradle 112 and can transmit a command to another UMM to travel to the location associated with the potential incident 140. For example, UMM operating component 132 may first transmit the command to another UMM to travel to the location, and once that UMM arrives, UMM operating component 132 can transmit the command to UMM 110 to return to the UMM launching cradle 112.

In another example, incident resolving component 134 can determine that the potential incident 140 has been resolved, which can be based on an indication from security personnel, or a deactivation of an alarm or trigger based on which the indicated was detected. In one example, incident resolving component 134 may detect resolution of the potential incident 140 based on the additional information received from the UMM 110 when at the location. For example, incident resolving component 134 may analyze video from the UMM 110 at the location, and can detect resolution of the potential incident 140 based on no longer detecting the potential incident 140 as present in the video (e.g., based on image recognition using AI, etc.). In this example, UMM operating component 132 can transmit a command to the UMM 110 to return to the UMM launching cradle 112 based on incident resolving component 134 detecting that the potential incident 140 has been resolved.

In some examples, countermeasure component 136 can provide one or more tracking technologies, such as a radar or frequency, for separate ground and/or air tracking of the UMMs 110 providing the surveillance functionality (also referred to herein as "security UMMs"), as a counter measure for the autonomous operations of the UMMs 110 by the other components of the building management system 102. In this regard, for example, the countermeasure component 136 can use the tracking technologies to provide a separately tracked indication of a location of the security UMMs 110 and/or may allow for control or overriding commands sent to the security UMMs 110 by the other components of the building management system 102. Various devices can be configured to provide the tracking technologies, and are not described herein for ease of explanation. Using separate systems and/or technologies to track the security UMMs 110, in this regard, can be used by the building management system 102 to ensure that the UMMs 110 are staying safe, are positioned where they are supposed to be at a certain point in time, and to assist with dealing with dynamic changes such as other aircraft, ground vehicles, debris, etc. The countermeasure component 136 can also use the tracking technologies to redirect the UMMs 110 to safety (e.g., back to the UMM launching cradle 112 or other location) in the event of potential collisions or interference.

Figure 2:
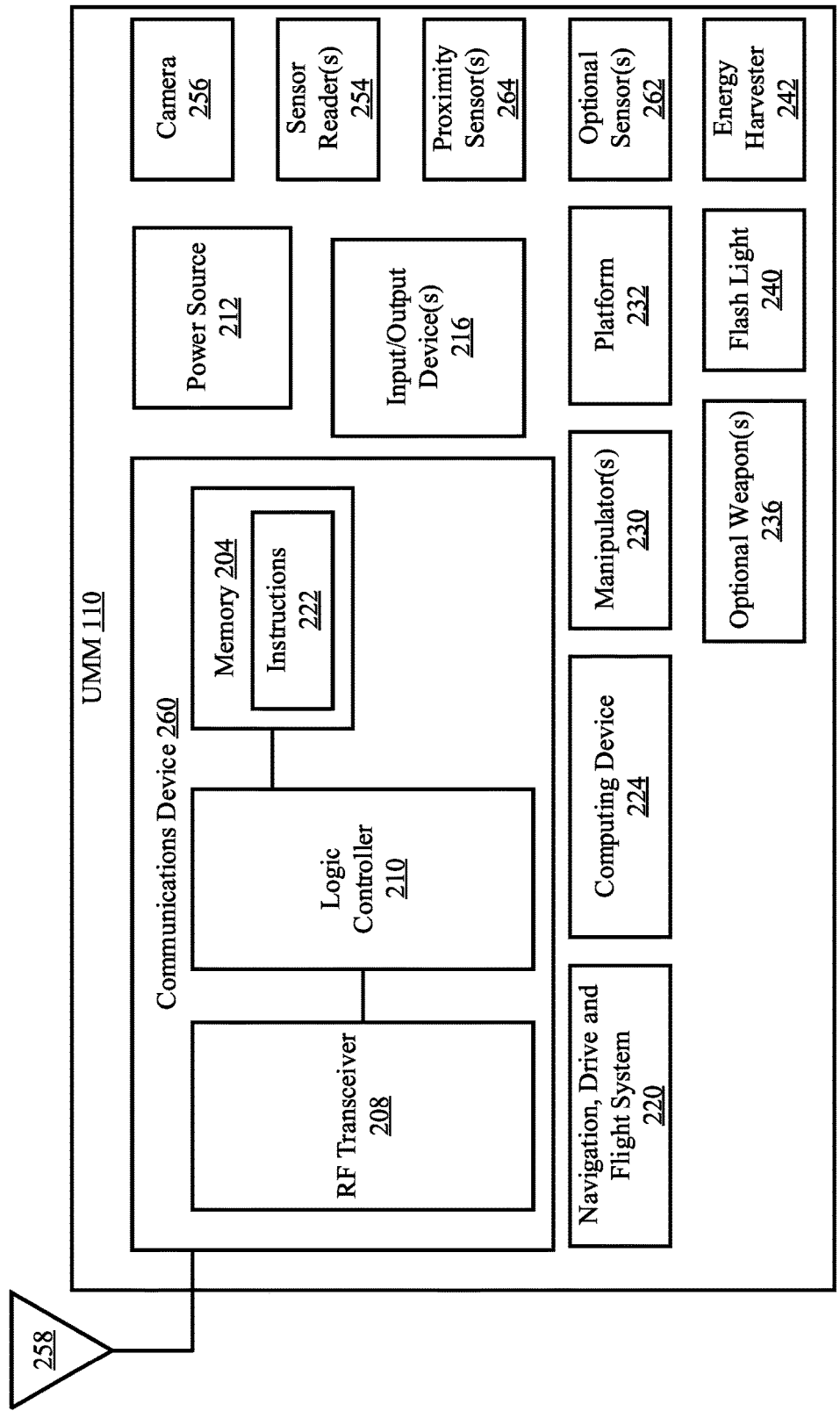
FIG. 2 illustrates a detailed block diagram of an example of an architecture for a UMM, in accordance with some aspects described herein.

FIG. 2 illustrates a detailed block diagram of an example of an architecture for a UMM, such as UMM 110. UMM 110 may include more or less components that that shown in FIG. 2. However, the components shown are sufficient to disclose an illustrative example UMM for implementing aspects described herein. Some or all of the components of the UMM 110 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of UMM 110 shown in FIG. 2 can represent an example of an architecture of a representative UMM 110 configured to facilitate incident surveillance. In an example, the UMM 110 comprises a communications device 260 for allowing data to be exchanged with an external device (e.g., a building management system 102, corresponding sensors 106 or cameras 108 installed in a building area 104, etc. via a wireless communication technology. The communication technology can include, but is not limited to, cellular technology, Radio Frequency ("RF") technology, Bluetooth technology, and/or WiFi technology. The components 204, 208, 210 shown in FIG. 2 may be collectively referred to herein as, or may be part of, the communications device 260, which may in some examples be similar to communications device 136 in the computing device 100 providing the building management system 102 or may otherwise be compatible for communicating therewith.

The communications device 260 can include various input and/or output devices 216, which may include a camera, speaker, microphone, display screen, buttons, keypad, etc. The communications device 260 can include a power source 212. The power source 212 includes, but is not limited to, a battery. The battery may be rechargeable. The battery may be recharged when it rests in the UMM launching cradle 112 of FIG. 1. Alternatively or additionally, the battery is recharged by an energy harvester 242. Energy harvesters are well known in the art, and therefore will not be described herein. Any known or to be known energy harvester can be used herein without limitation. In some scenarios, the energy harvester 242 harvests energy from light, heat, RF fields, and/or magnetic fields.

The communications device 260 comprises an antenna 258 for allowing data to be exchanged with the external device via a wireless communication technology (e.g., RFID technology or other RF based technology). The external device may comprise the building management system 102, sensors 106 or cameras 108 of FIG. 1. In this case, the antenna 258 is configured to transmit signals to and received signals from the listed external devices. In this regard, the communications device 260 comprises an RF transceiver 208. RF transceivers are well known in the art, and therefore will not be described herein. However, it should be understood that the RF transceiver 208 receives RF signals including information from a transmitting device, and forwards the same to a logic controller 210 for extracting the information therefrom.

The extracted information can be used to initiate operations of the UMM and/or determine the identity of and/or location of a person associated with detected unusual activity. Accordingly, the logic controller 210 can store the extracted information in memory 204, and execute algorithms using the extracted information. For example, the logic controller 210 can: receive a command from the building management system 102 to initiate or activate mitigation operations thereof; receive information from the building management system 102 that is useful for performing incident surveillance, such as traveling to a location of a potential incident, recording and/or reporting information related to the potential incident back to the building management system 102, track an object or person related to the potential incident, return to the launching cradle 112 based on a status of the UMM 110 or a resolution status of the potential incident, and/or the like. In some examples, a camera 108 can include one or more cameras and can include, but is not limited to, a red, green, blue (RGB) or other visible camera, an infrared (IR) camera and/or an ultraviolet (UV) camera.

In some scenarios, the UMM 110 can take measures to facilitate a continued tracking of an object or person related to a potential incident as the person or object travels a certain distance from the potential incident. For example, the UMM 110 may track the object or person using reidentification to continually track the object or person position in an image received from a camera 256 of the UMM 110, and updating the position of the UMM 110 relative to tracked position change or movement of the object or person in various images.

The UMM 110 may also comprise at least one sensor reader 254. The sensor reader 254 can generally be configured to: receive a command signal from the communications device 260 to read certain tags or items within the building area 104 to obtain unique identifiers and/or other information therefrom; and communicate the unique identifiers and/or other information to the communications device 260 for reporting to the building management system 102.

The UMM 110 may further comprise at least one proximity sensor 264 (e.g., an acoustic sensor or infrared sensor) and/or other sensor 262. The proximity sensor 264 detects the distance from the UMM 110 to the potential incident and/or the distance from the UMM 110 to a person or object, etc. In an example, proximity sensor 264 may include a magnetometer to achieve obstacle avoidance with the UMM 110 is in flight.

A distance threshold value can be applied to trigger certain operational modes of the UMM 110. For example, the UMM 110 can detect an incident of a power outage and/or a person needing or requesting assistance during a power outage. The UMM 110 can activate a flash light 240, and as the UMM 110 travels with the person throughout the building area 104, the proximity sensor 264 can detect a proximity to the person for more accurate tracking to keep within a certain distance relative to the person to provide a predictable light pattern from the flash light 240. In another example, the proximity sensor 264 can be used to detect proximity to a person or object associated with the incident for use of optional weapons 236, such as non-lethal weapons, in the event that circumstances escalate to a point that non-lethal force is necessary to prevent injury to other persons. The non-lethal weapons include, but are not limited to, pepper spray and/or tasers.

By adding a highly directional antenna 258 to the UMM 110, the UMM 110 can be provided with an improved sensor directionality. During operation, the motion of the UMM 110 can be modulated so that a fixed sensor 254, 262, 264 is able to effectively scan back and forth.

As noted above, the camera 256 and/or sensors 254, 262, 264 can be configured to obtain information about individuals, items, security tags, vehicles, license plates, and/or personal devices (e.g., smart phones, cellular phone, personal digital assistants, etc.). This information can be logged in memory 204, and/or communicated to an external datastore (e.g., a remote database). Memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 222 can be stored in memory for execution by the communications device 260 and that can cause the communications device 260 to perform any one or more of the methods or methodologies described herein. The instructions 222 can generally be operative to facilitate the incident surveillance. Other functions of the communications device 260 may become apparent in conjunction with the described aspects.

As shown in FIG. 2, the UMM 110 can also include a computing device 224. The computing device 224 can generally be configured to control operations of the UMM 110. These operations include, but are not limited to, autonomous operations to (a) travel to locations of potential incidents, (b) provide a video feed or other information at the location of the potential incidents, (c) identify objects or persons involved in the potential incidents, (d) track movements of persons, (e) retreat to a launching cradle, (f) communicate with persons via auditory and/or visual outputs, (g) use non-lethal force against individuals, (h) generate a map or mapping of the individuals and/or strategically placed tracking devices showing their relative positions to a reference location, (i) log information, and/or (j) communicate information to and from security personnel and/or law enforcement officials.

The computing device 224 can include a desktop computer, a personal computer or any other device capable of processing and storing data. Computing device 224 may be the same as or substantially similar to the communications device 100 shown in FIG. 1. As such, the discussion provided above in relation to FIG. 2 is sufficient for understanding the computing device 224 of the UMM 110.

The UMM 110 may also include a platform 232. The platform 232 can be adapted to hold, contain and/or otherwise support tracking devices 244 and/or other items. In some scenarios, the platform 232 comprises a deck or a bed with a single support surface or multiple support surfaces separated by dividers (e.g., bins, shelves or drawers). The tracking devices 244 and/or other items can be placed on or removed from the platform 232 via the manipulator(s) 230. The manipulator(s) 230 can also be used to place tracking devices 244 and/or other items at strategic locations within an area of interest and/or on objects of interest. In this regard, the manipulator(s) 230 can generally be configured to grasp or otherwise hold the tracking devices 244 and/or other items.

The navigation, drive, and flight (NDF) system 220 of UMM 110 is generally configured to move the UMM 110 within a surrounding environment without coming in contact with obstructions and without tipping over. In this regard, the NDF system 220 includes, but is not limited to, a propulsion system, a drive train, drive wheels, and/or tracks (such as those found on tanks). The NDF system 220 can be configured to continuously determine and track the UMM's position and location relative to other objects within a surrounding environment. The NDF system 220 may also be capable of using computer vision over GPS, e.g., along with one or more magnetometers or other sensors, to achieve obstacle avoidance during flight. NDF systems are well known in the art, and therefore will not be described in detail herein. Any known or to be known NDF system can be used herein without limitation. In some scenarios, beacons and/or RFID tags are used by the NDF system 220 to track the UMM's location within a given area. Additionally or alternatively, the NDF system 220 uses other techniques (e.g., triangulation) to track the UMM's location.

The UMM 110 is not limited to the architecture shown in FIG. 2. The UMM 110 may include more or less components as that shown in FIG. 2. For example, the UMM 110 can include Light Detection And Ranging ("LIDAR") devices for further facilitating the generation of accurate relative distance and direction information. LIDAR devices are well known in the art, and therefore will not be described herein. Any known or to be known LIDAR device can be used herein without limitation.

Figure 3:
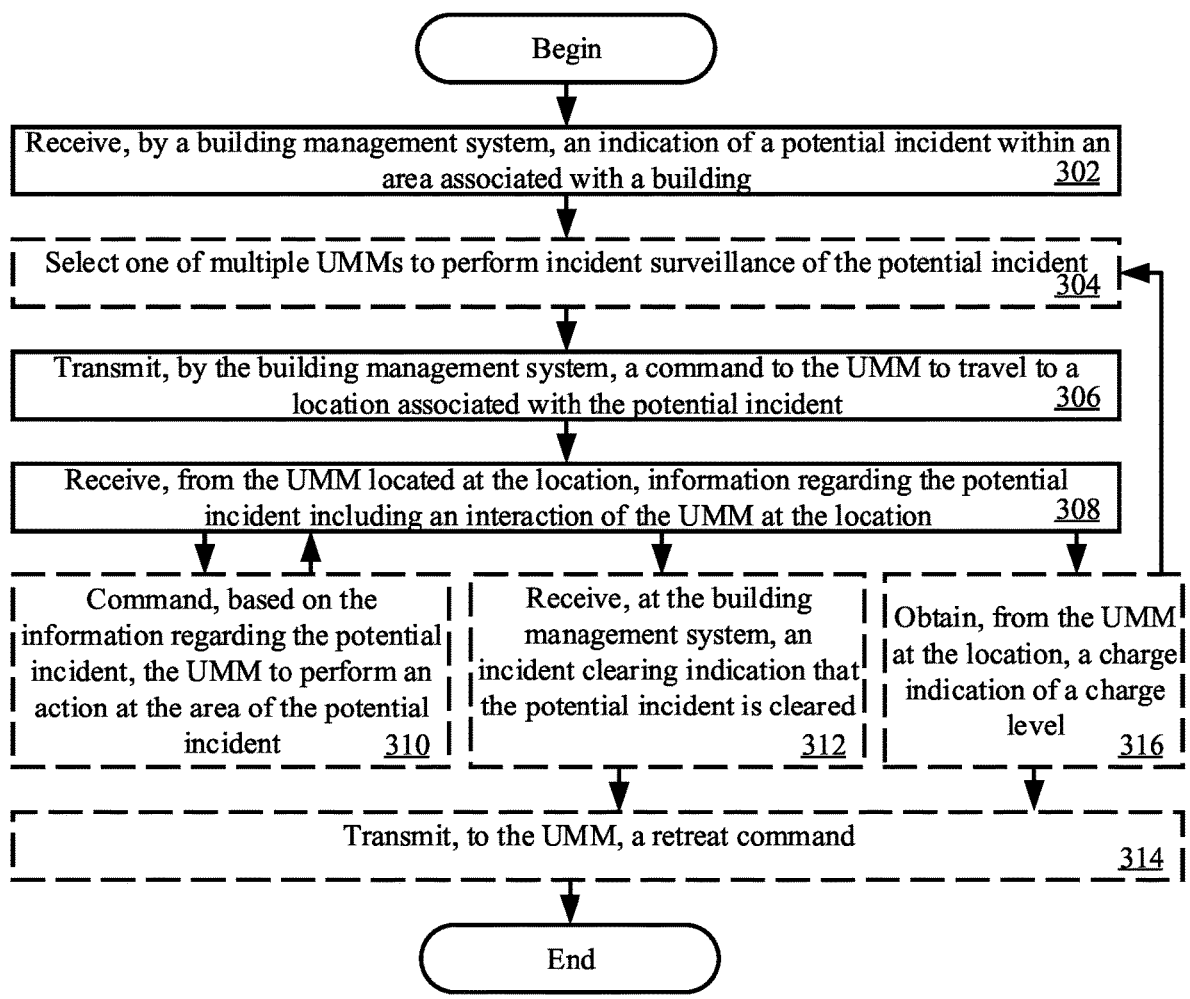
FIG. 3 is a flowchart of an example of a method for surveilling potential incidents using a UMM, in accordance with some aspects described herein.
Figure 4:
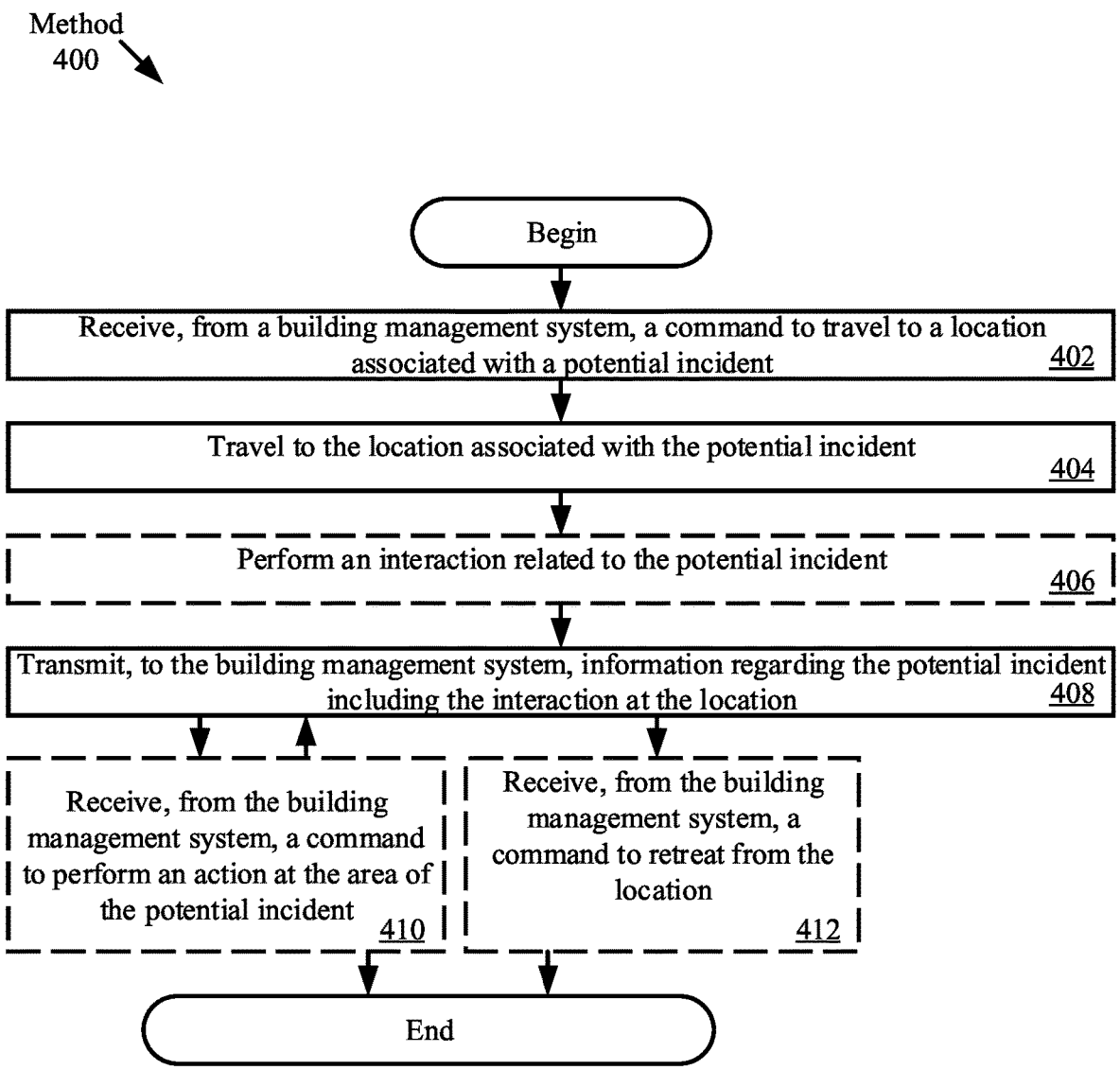
FIG. 4 is a flowchart of an example of a method for surveilling potential incidents, in accordance with some aspects described herein.

FIG. 3 is a flowchart of an example of a method 300 for surveilling potential incidents using a UMM. For example, method 300 can be performed by a computing device 100, building management system 102, and/or one or more systems or components thereof to facilitate incident surveillance via the UMM 110. FIG. 4 is a flowchart of an example of a method 400 for surveilling potential incidents. For example, method 400 can be performed by a UMM 110, and/or one or more systems or components thereof to facilitate incident surveillance. Methods 300 and 400 are described in conjunction with one another for ease of explanation; however, the methods 300 and 400 can be separately performed by different systems or components, as shown and described herein, and are not required to be performed together.

At block 302, method 300 can including receiving, by a building management system, an indication of a potential incident within an area associated with a building. In an aspect, incident detecting component 130, e.g., in conjunction with computing device 100, building management system 102, processor 120, memory 122, sensor(s) 106, camera(s) 108, etc., can receive, by the building management system 102, the indication of the potential incident 140 within the area associated with the building area 104. For example, the area associated with the building area 104 can include an area inside of the building, outside of the building, within a perimeter of a fence around the building, in a parking lot near the building, etc. In an example, building management system 102 can receive the indication of the potential incident from one or more sensors 106 or cameras 108 or other systems connected to the building management system 102 (which may employ the one or more sensors 106 or cameras 108), as described above. In another example, building management system 102 can generate the indication of the potential incident based on information received from the one or more sensors 106 or cameras 108, which can include detecting values from the sensor(s) 106 that exceed a threshold, detecting certain objects, persons, activities, etc., in images from camera(s) 108, etc. The received or generated indication can be associated with a location of the potential incident, which may include a location of the one or more sensors 106, cameras 108, a location received from the one or more sensors or cameras, and/or the like.

At block 304, method 300 can optionally include selecting one of multiple UMMs to perform incident surveillance of the potential incident. In an aspect, UMM operating component 132, e.g., in conjunction with computing device 100, building management system 102, processor 120, memory 122, etc., can select the one of the multiple UMMs (e.g., UMM 110) to perform incident surveillance of the potential incident 140. For example, UMM operating component 132 can select the UMM 110 from multiple possible UMMs that are coupled with the building management system 102 to surveil the potential incident. For example, UMM operating component 132 can select the UMM 110 based on a proximity of the UMM to the potential incident (e.g., as compared to other UMMs), a battery charge state of the UMM (e.g., as compared to other UMMs), a type of the potential incident detected (e.g., where the UMM 110 can be equipped to resolve or surveil the type of potential incident as compared to other UMMs), etc. In addition, in some examples, UMM operating component 132 can select multiple UMMs to send to surveil, or assist in resolving, the potential incident, as described above.

At block 306, method 300 can include transmitting, by the building management system, a command to the UMM to travel to a location associated with the potential incident. In an aspect, UMM operating component 132, e.g., in conjunction with computing device 100, building management system 102, processor 120, memory 122, communications device 136, etc., can transmit, by the building management system 102, a command to the UMM to travel to a location associated with the potential incident. For example, UMM operating component 132 can transmit the command to the UMM 110 including a location to which the UMM 110 is to travel to surveil the potential incident. In addition, for example, UMM operating component 132 can transmit the command to the UMM 110 indicating one or more actions to be performed or information requested by the building management system 102 in surveilling the potential incident 140. For example, the command may request the UMM 110 to record and send back video from the area of the potential incident 140 once the UMM 110 arrives. In some examples, this can enable the building management system 102 to refine the type or severity of the potential incident 140 from the video feed received from UMM 110. In other examples, the command may request the UMM 110 to obtain and/or deliver an item to the area of the potential incident, as described above. In other examples, the command may request the UMM 110 to activate a flash light to illuminate an area, activate one or more weapons in the area, etc., as described above.

At block 402, method 400 can include receiving, from the building management system, a command to travel to a location associated with a potential incident. In an aspect, UMM 110, e.g., in conjunction with computing device 224, communications device 260, etc., can receive, from the building management system 102, the command to travel to the location associated with the potential incident. For example, UMM 110 can receive the command including a location to which the UMM 110 is to travel to surveil the potential incident. In addition, for example, UMM 110 can receive the command indicating one or more actions to be performed or information requested by the building management system 102 in surveilling the potential incident 140. For example, the command may request the UMM 110 to record and send back video from the area of the potential incident 140 once the UMM 110 arrives, request the UMM 110 to obtain and/or deliver an item to the area of the potential incident, request the UMM 110 to activate a flash light to illuminate an area, activate one or more weapons in the area, etc., as described above.

At block 404, method 400 can include traveling to the location associated with the potential incident. In an aspect, UMM 110, e.g., in conjunction with computing device 224, NFD system 220, etc., can travel to the location associated with the potential incident. As described, for example, the command can indicate the location associated with the potential incident, which can be a location in an area of the potential incident, a location within a certain distance of the potential incident, etc. For example, the location may include GPS coordinates of a location to which the UMM 110 can navigate, or other indication of a location understood by the UMM 110 for traveling. In one example, the command can include flight path instructions for traveling to the location associated with the potential incident. For example, the location can be within a building area, such as within the building or outside of the building (e.g., within a perimeter of the outside of the building). In some examples, the UMM 110 can be configured to fly from within the building to an area outside of the building and/or from outside of the building to an area within the building. In another example, separate UMMs 110 can be provided for flying within and outside of the building. In an example, the UMM 110 can use additional technologies, such as computer vision over GPS, magnetometers, etc., to achieve autonomous obstacle avoidance during flight.

At block 406, method 400 can optionally include performing an interaction related to the potential incident. In an aspect, UMM 110, e.g., in conjunction with computing device 224, various sensors 254, 262, or 264, camera 256, optional weapons 236, flash light 240, etc., can perform the interaction related to the potential incident. For example, as described, this can include recording video via camera 256, obtaining sensor measurements via one or more sensors 254, 262, or 264, activating flash light 240 to illuminate an area, firing optional weapons 236, etc., which UMM 110 can perform based on the command received from the building management system 102.

At block 408, method 400 can include transmitting, to the building management system, information regarding the potential incident including the interaction at the location. In an aspect, UMM 110, e.g., in conjunction with computing device 224, communications device 260, etc., can transmit, to the building management system 102, the information regarding the potential incident including the interaction at the location. For example, UMM 110 can transmit recorded or real-time video feed captured by the camera 256 when the UMM 110 is at the location. In another example, UMM 110 can transmit value information of one or more measurements of sensors 254, 262, or 264. In another example, UMM 110 can transmit status information of the flash light 240 or optional weapons 236, audio information from a microphone, etc. In another example, UMM 110 can transmit an indication of an action performed in an attempt to resolve the potential incident.

At block 308, method 300 can include receiving, from the UMM located at the location, information regarding the potential incident including an interaction of the UMM at the location. In an aspect, UMM operating component 132, e.g., in conjunction with computing device 100, building management system 102, processor 120, memory 122, communications device 136, etc., can receive, from the UMM 110 located at the location, the information regarding the potential incident including the interaction of the UMM 110 at the location. For example, the information can include the video feed from the camera of the UMM 110, as described above, or can include status information regarding the potential incident as detected by the UMM 110, such as a value from one or more sensors on the UMM 110 that may indicate an incident status (e.g., a temperature or air quality sensor, a microphone or other audio sensor, etc.). In an example, building management system 102 can continue to receive the information from the UMM 110 for a period of time (e.g., until a status of the potential incident is marked as, or determined to be, resolved). For example, the building management system 102 can continue to receive the information, such as the video feed, for the period of time, which the building management system 102 can record, display (e.g., on a display for viewing by security personnel), etc. As such, in one example, the UMM 110 can act as a surveillance camera that can be rapidly deployed to an area where camera coverage may not be otherwise provided or sufficient.

At block 310, method 300 can optionally include commanding, based on the information regarding the potential incident, the UMM to track a subject identified in the information. In an aspect, UMM operating component 132, e.g., in conjunction with computing device 100, building management system 102, processor 120, memory 122, communications device 136, etc., can command, based on the information regarding the potential incident received from the UMM 110 (or from other sensors or cameras), the UMM 110 to perform an action at the area of the potential incident. For example, UMM operating component 132 can command the UMM 110 to track a subject (e.g., a person or object) identified in the information. For example, building management system 102 can identify an individual causing the incident, through manual indication by security personnel on the video received from the UMM 110, through image recognition or other image processing, etc., and can accordingly command the UMM 110 to track movement of the person throughout the building area 104 or associated area. In another example, UMM operating component 132 can command the UMM 110 to perform one of many other various actions based on the information received from the UMM 110, such as to activate a flash light or weapons, to sound an alarm or other sound or speech related to the incident, to obtain and/or deliver an item to facilitate resolution of the potential incident, to maintain video recording, etc. In addition, for example, the building management system 102 can continue to receive information regarding the potential incident from the UMM 110, at block 308, based on commanding the UMM 110.

At block 410, method 400 can optionally include receiving, from the building management system, a command to perform an action at the area of the potential incident. In an aspect, UMM 110, e.g., in conjunction with computing device 224, communications device 260, etc., can receive, from the building management system 102, the command to perform the action at the area of the potential incident. For example, as described above, the UMM 110 can report the information to the building management system 102, and the building management system 102 may accordingly request additional actions be performed by the UMM 110, such as additional video recording, tracking of a subject in the area of the potential incident, activating of a flash light 240 or optional weapons 236, retrieval and delivery of an item, etc., and UMM 110 can accordingly perform the additional requested action(s).

At block 312, method 300 can optionally include receiving, at the building management system, an incident clearing indication that the potential incident is cleared. In an aspect, incident resolving component 134, e.g., in conjunction with computing device 100, building management system 102, processor 120, memory 122, sensor 106, camera 108, communications device 136, etc., can receive, at the building management system 102, the incident clearing indication that the potential incident is cleared. For example, a determination that the potential incident is cleared can be performed by the UMM 110 (e.g., based on the video recorded by the UMM 110, an audio indicator received by the UMM 110, such as a person indicating the incident is resolved, etc.), the one or more sensors 106 (e.g., no longer detecting a measured value exceeding a threshold), the one or more cameras 108, etc. In another example, the determination that the potential incident is cleared can be performed by the building management system 102, which can be based on the information received from the UMM 110, information from sensors 106 or camera 108, etc.

At block 314, method 300 can optionally include transmitting, to the UMM, a retreat command. In an aspect, UMM operating component 132, e.g., in conjunction with computing device 100, building management system 102, processor 120, memory 122, communications device 136, etc., can transmit, to the UMM 110, the retreat command to retreat to a previous location or to the UMM launching cradle 112, etc., which can be based on receiving the clearing indication that the potential incident is cleared. In one example, the UMM 110 can remain in the UMM launching cradle 112 (e.g., for charging) until the UMM operating component 132 transmits another command to the UMM 110 (e.g., for another potential incident).

At block 316, method 300 can optionally include obtaining, from the UMM at the location, a charge indication of a charge level. In an aspect, UMM operating component 132, e.g., in conjunction with computing device 100, building management system 102, processor 120, memory 122, communications device 136, etc., can obtain, from the UMM 110 at the location, the charge indication of the charge level. For example, UMM operating component 132 can receive the charge level on request, as a periodic report from the UMM 110, etc. In some examples, where the charge level becomes less than a threshold, UMM operating component 132 can transmit, to the UMM 110, the retreat command so the UMM 110 can return to the UMM launching cradle 112 for charging. In addition, for example, where the charge level becomes less than a threshold, method 300 can proceed back to block 304 where the UMM operating component 132 can select a different UMM to perform surveillance of the potential incident. In this example, UMM operating component 132 can also transmit the retreat command to UMM 110 based on selecting the other UMM to take its place in surveillance. As such, for example, UMM operating component 132 can transmit the retreat command to the UMM 110 after dispatching the other UMM, once the other UMM arrives at the location, and/or the like.

At block 412, method 400 can optionally include receiving, from the building management system, a command to retreat from the location. In an aspect, UMM 110, e.g., in conjunction with computing device 224, communications device 260, etc., can receive, from the building management system 102, the command to retreat from the location. For example, the command may indicate to retreat to a previous location or otherwise stop surveilling the area of the potential incident. In another example, the command may indicate to retreat to a UMM launching cradle 112 (e.g., for charging), as described above.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage de-vices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for operating an Unmanned Mobile Machine ("UMM") to perform incident surveillance, comprising:
   a memory; and
   a processor communicatively coupled with the memory, wherein the processor is configured to:
   receive an indication of a potential incident within an area associated with a building;
   transmit a command to the UMM to travel to a location associated with the potential incident and capture video of the potential incident;

receive, from the UMM located at the location, information regarding the potential incident including an interaction of the UMM at the location;

obtain, from the UMM at the location, a charge indication of a charge level;

transmit, based at least in part on the charge level, a second command to a second UMM to travel to the location associated with the potential incident and capture video of the potential incident;

based on arrival of the second UMM to the location, transmit, to the UMM, a retreat command to retreat to a launching cradle for charging; and receive, from the second UMM located at the location, second information regarding the potential incident including a second interaction of the second UMM at the location.

2. The apparatus of claim 1, wherein the processor is configured to receive the information as a video or audio recorded by an input device of the UMM at the location.

3. The apparatus of claim 1, wherein the processor is configured to receive the information as an action indication of an action taken by the UMM in an attempt to rectify the potential incident.

4. The apparatus of claim 1, wherein the processor is further configured to command, based on the information regarding the potential incident, the UMM to track a subject identified in the information.

5. The apparatus of claim 1, wherein the processor is further configured to select the second UMM based at least in part on a second charge level of the second UMM.

6. The apparatus of claim 1, wherein the processor is configured to transmit the command including transmitting multiple commands to each of multiple UMMs, and wherein the processor is configured to receive the information as multiple information from each of the multiple UMMs located at the location.

7. The apparatus of claim 1, wherein the processor is further configured to:

receive an incident clearing indication that the potential incident is cleared; and transmit, to the second UMM and based on receiving the incident clearing indication, a retreat command related to leaving the location.

8. The apparatus of claim 1, wherein the processor is configured to receive the indication of the potential incident from the UMM.

9. The apparatus of claim 1, wherein the processor is further configured to separately perform tracking of the UMM using radar or frequency.

10. An apparatus for surveilling a potential incident, comprising:

a memory;

a processor communicatively coupled with the memory;

a camera; and a navigation, drive, and flight (NDF) system configured to travel to locations associated with a building, wherein the processor is configured to:

receive, from a building management system, a command to travel to a location associated with a potential incident;

travel, via the NDF system, to the location associated with the potential incident;

perform, via the camera, an interaction related to the potential incident to acquire information regarding the potential incident;

transmit, to the building management system, the information regarding the potential incident; and retreat to a launching cradle based on receiving, from the building management system, based on arrival of a second Unmanned Mobile Machine (UMM) at the location, and during the interaction related to the potential incident, a retreat command related to leaving the location.

11. The apparatus of claim 10, wherein the processor is configured to transmit the information as video from the camera recorded at the location associated with the potential incident.

12. The apparatus of claim 10, wherein the processor is configured to transmit the information as an action indication of an action taken by the apparatus in an attempt to rectify the potential incident.

13. The apparatus of claim 10, wherein the processor is further configured to cause the apparatus to track a subject at the location of the potential incident based on a command received from the building management system.

14. A computer-implemented method for operating an Unmanned Mobile Machine ("UMM") to perform incident surveillance, comprising:

receiving, by a building management system, an indication of a potential incident within an area associated with a building;

transmitting, by the building management system, a command to the UMM to travel to a location associated with the potential incident and capture video of the potential incident;

receiving, from the UMM located at the location, information regarding the potential incident including an interaction of the UMM at the location;

obtaining, from the UMM at the location, a charge indication of a charge level;

transmitting, based at least in part on the charge level, a second command to a second UMM to travel to the location associated with the potential incident and capture video of the potential incident;

based on arrival of the second UMM to the location, transmitting, to the UMM, a retreat command to retreat to a launching cradle for charging; and receiving, from the second UMM located at the location, second information regarding the potential incident including a second interaction of the second UMM at the location.

15. The computer-implemented method of claim 14, wherein receiving the information includes receiving a video or audio recorded by an input device of the UMM at the location.

16. The computer-implemented method of claim 14, wherein receiving the information includes receiving an action indication of an action taken by the UMM in an attempt to rectify the potential incident.

17. The computer-implemented method of claim 14, further comprising commanding, based on the information regarding the potential incident, the UMM to track a subject identified in the information.

18. The computer-implemented method of claim 14, further comprising selecting the second UMM based at least in part on a second charge level of the second UMM.

19. The computer-implemented method of claim 14, wherein transmitting the command includes transmitting multiple commands to each of multiple UMMs, and wherein receiving the information includes receiving the information as multiple information from each of the multiple UMMs located at the location.

* * * * *